United States Patent Office 2,831,289
Patented Apr. 22, 1958

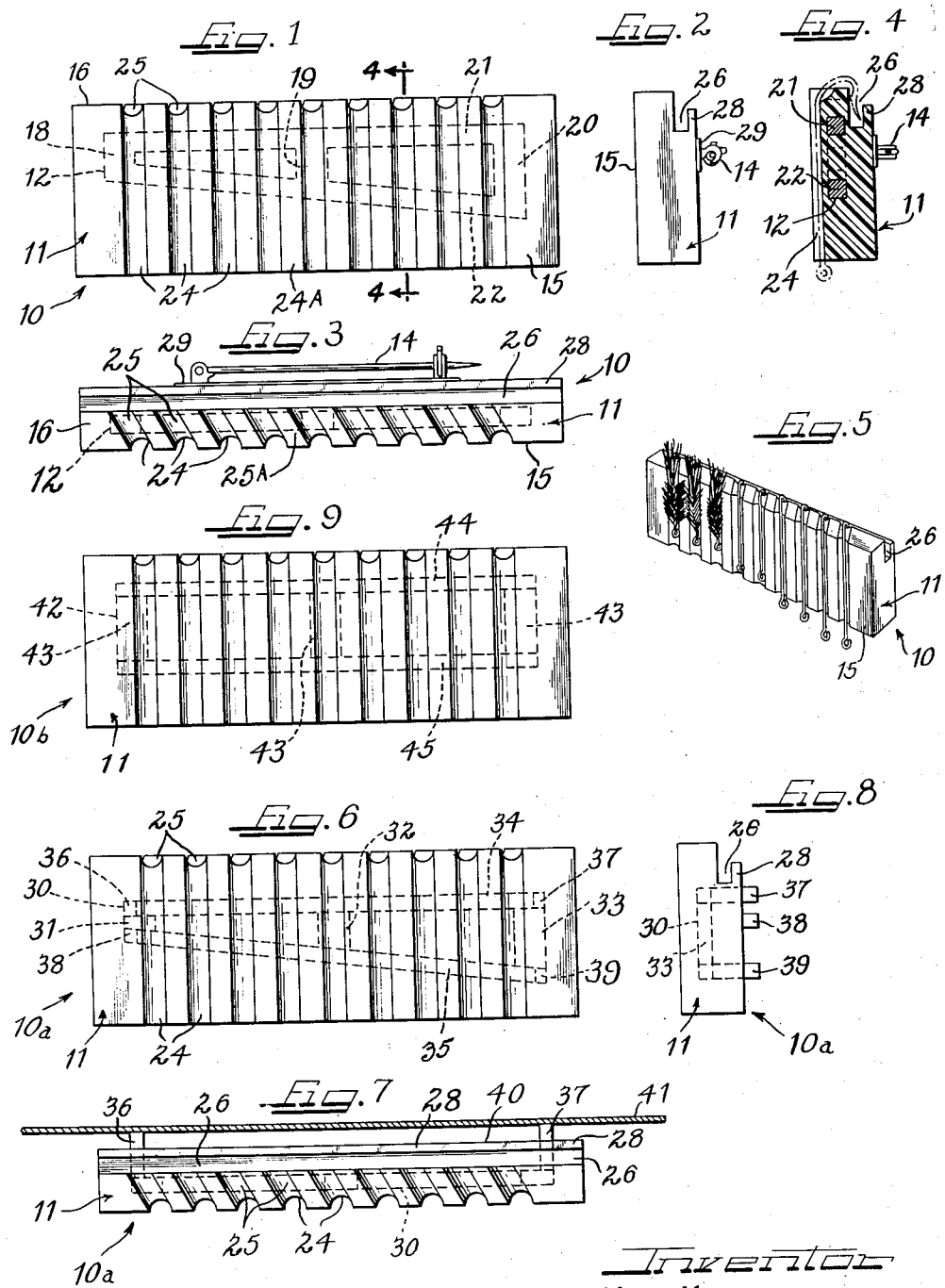

2,831,289

MAGNETIC FISH HOOK AND LURE HOLDER

Max Klinghoffer, Elmhurst, Ill.

Application December 31, 1953, Serial No. 401,566

7 Claims. (Cl. 43—57.5)

The present invention relates in general to fishing accessories and, more specifically, to a novel hook and lure holder of the magnetic type.

The general object of the invention is to provide a magnetic fish hook and lure holder capable of positively holding a wide variety of hooks and lures but permitting easy removal thereof by the deliberate act of the user.

Another object is to provide a hook and lure holder of light, inexpensive construction capable of being carried on the person of the user in an accessible position such as on the hatband or on the shirt.

Still another object is to provide a magnetic hook and lure holder of the character set forth and which is adapted to take advantage of its magnetic assembly for mounting the holder on a support such as the sidewall of a tackle box as well as for retaining the hooks and lures on the holder.

Other objects and advantages of the invention will become apparent from the following detailed description, taken with the accompanying drawing, wherein:

Figure 1 is a front elevation of an illustrative hook and lure holder embodying the present invention.

Figs. 2 and 3 are, respectively, end and top views of the holder shown in Fig. 1.

Fig. 4 is a transverse sectional view taken through the holder of Fig. 1 and in the plane of the line 4—4.

Fig. 5 is a front perspective view of the illustrative holder of Fig. 1 with an assortment of hooks and lures stored thereon.

Figs. 6, 7 and 8 are, respectively, front elevation, top and end views of another modified holder also embodying the present invention.

Fig. 9 is a front elevation of a slightly modified holder embodying the present invention.

While the invention is susceptible of various modifications and alternative constructions, certain preferred embodiments have been shown in the drawings and will be described below in considerable detail. It should be understood, however, that there is no intention to limit the invention to the specific forms disclosed, but on the contrary, the intention is to cover all modifications and alternative constructions falling within the spirit and scope of the invention as expressed in the appended claims.

Referring more specifically to Figs. 1 to 5, inclusive, the invention is there exemplified in an illustrative fish hook and lure holder 10 of the magnetic type and which, in the present instance, happens to be of a generally rectangular form. The holder 10 comprises a body 11 of non-magnetic material, a magnetic member or assembly 12 encased within the body 11, hook and lure engaging means, and a mounting means such as a safety pin 14 which adapts the holder for attachment to a hatband, shirt, or other article of clothing. The body 11, which may conveniently be fabricated of molded plastic material, includes a front face 15 and a top face 16 both adapted to receive fish hooks and lures.

For the purpose of yieldably holding hooks and lures against the body faces 15, 16, the body is equipped with the magnetic assembly 12. The latter is in this instance fashioned as a closed loop and comprises permanent magnetic elements 18, 19, 20 together with upper and lower pole bars 21, 22. The magnetic elements 18, 19, 20 are magnetically oriented in the same direction so that the upper pole bar 21 will have one polarity, for example North, while the lower pole bar 22 will have opposite polarity, in this case South.

To accommodate hooks and lures having a variety of different shank lengths, the magnetic assembly 12 may be tapered longitudinally of the body 11, as shown in Fig. 1. This is accomplished by making the magnetic elements 18, 19 and 20 of progressively increasing lengths so that the pole bars 21, 22 will be skewed with relation to each other. Since all the hooks and lures will engage the top face 16 of this body, but not all their shanks will extend completely to the bottom of the front face 15, the upper pole bar 21 is preferably maintained approximately parallel with the top face 16 and the lower pole bar 22 is angled downwardly.

The magnetic member or assembly 12 may be fabricated in a variety of ways without departing from the scope of the invention. For instance, the magnetic elements 18, 19, 20 of the assembly 12 may comprise three separate bar magnets of high permeability material such as that known in the trade as "Alnico." In such event the pole bars 21, 22 would probably be made from soft steel bar stock positively attached to the pieces 18, 19, 20 in any suitable manner. Alternatively, the assembly 12 may be formed as a single, integral, piece of material such as sintered "Alnico" and then be permanently magnetized as a unit.

Provision is made in the holder 10 for receiving a plurality of hooks or lures and holding them individually by yieldable magnetic forces which act from at least two, and in this instance from the three, directions. In furtherance of such objective, the front face 15 has formed therein a series of spaced apart transverse grooves or gashes 24 with a series of ribs 24A spaced alternately therewith. Each gash 24 is adapted to receive the shank portion of a hook or lure and extends from the lower part of the face 15 up into the top face 16 of the holder body. At their upper ends, the gashes or grooves 24 communicate with a corresponding series of gashes or grooves 25 in the top face 16, the gashes or grooves 25 alternating with ribs 25A and each gash 25 being adapted to accommodate the curved portion of a hook. In order to facilitate application of magnetic holding forces acting on the barbed portion of the hook and from the rear of the body 11, the gashes 25 in the top face 16 are all transversely skewed in the same direction, as shown in Figs. 3 and 5. In addition, the top face 16 is relieved so as to define therein a hook trough 26 toward the rear of the body. By reason of the arrangement just described, each hook, whether it be plain or part of a lure or fly, is yieldably but positively held in closely nested relation with that portion of the body 11 which surrounds the upper pole bar 21. When held in this position, the force of gravity supplements the magnetic retaining forces and the result is that the hook can only be disengaged by the deliberate act of the user, namely, applying first an upward force to the hook and then pulling the same away from the front face 15 of the holder.

To prevent snagging of the stored hooks in the user's clothing, an upstanding guard wall 28 is situated on the holder 10 in spaced relation to the top face 16. In this case, the guard wall 28 is substantially coplanar with the rear face of the hanger 10 and also serves to define the rear side of the hook trough 26.

As indicated earlier herein, the holder 10 has a suitable mounting means, in this instance the safety pin 14, fixed to its rear face for attachment to the user's hatband, shirt, or other wearing apparel. The safety pin 14 may assume a variety of forms and in this case includes an attaching plate 29. The pin 14 is preferably mounted above center so that the holder 10 will hang as close as possible to its support.

Turning now to Figs. 6, 7 and 8, there is shown a modified form of hook and lure holder 10A also embodying the present invention. The holder 10A has many parts in common with the holder 10 described earlier herein, said common parts being designated by like reference numerals and a detailed description of them being unnecessary. Thus, the holder 10A has a body 11 with grooves or gashes 24, 25 in its front and top faces 15, 16, and in addition, has a hook trough 26 and guard wall 28.

Provision is made in the holder 10A for mounting the same on the wall of a steel tackle box or any suitable support of magnetizable material. This is accomplished by the simple expedient of taking advantage of the magnetic assembly 30 of the holder 10A. Like the assembly 11 of the holder 10, the magnetic assembly 30 comprises a plurality of permanent magnetic elements 31, 32, 33 together with upper and lower pole bars 34, 35, the latter being fixed to the magnetic elements in any suitable manner. The orientation of these parts is such that the pole bars 34 and 35 are of opposite polarity and the lower pole bar 35 may be angled downwardly after the manner of the pole bar 22 of holder 10.

In furtherance of the foregoing objective, the pole bars 34, 35 are fashioned in the form of shallow U's, their ends 36, 37, 38 and 39 being extended so as to project substantially through, and possibly beyond, the rear face 40 of the holder 10A (Figs. 7 and 8). In addition, all the pole bar ends are squared off to the same length so that they will lie flush against a support such as steel tackle box wall 41. When the holder 10A is positioned on the support 41, its magnetic assembly 30 imparts sufficient magnetic force to hold it snugly in place and, at the same time, to hold hooks and lures in the manner already described.

Referring next to Fig. 9, there is shown another modified holder 10B which also embodies the invention. The holder 10B has a body 11 similar to that of the holders 10 and 10A. The holder 10B differs from these holders in that it includes a magnetic assembly 42 comprising a plurality of permanent magnetic elements 43 of identical form and size, together with a pair of pole bars 44, 45 fixed to the elements 43 and disposed in substantially parallel relationship. The spacing of the bars 44, 45 is set at a dimension which will permit the holder to accommodate an average assortment of hooks and lures. The magnetic assembly 42 is of course applicable to holders of the pin mounted type such as holder 10 or of the box mounted type such as holder 10A.

As in the case of the magnetic members of assemblies 12 and 30 described earlier herein, the magnetic assembly 42 of the holder 10B may be fashioned as a single piece of integral construction. In such event, cast or sintered "Alnico" or some other material capable of retaining a high level of permanent magnetism may be utilized for the assembly 42.

I claim as my invention:

1. A fish hook and lure holder comprising, in combination, a body of non-magnetic material having a front face and a top face, said front face having a plurality of spaced apart grooves therein, said top face having a plurality of grooves each connecting with a corresponding one of said front face grooves but being skewed relative to said top face, said top face grooves being skewed in the same general direction, an upstanding rear wall on said body disposed in spaced relation with said top face and defining therewith a hook trough, and a magnetic assembly formed into a loop housed within said body for holding one or more hooks in corresponding ones of said grooves, a portion of said magnetic loop extending along one side of the hook trough, and means for attaching said holder to a support.

2. A fish hook and lure holder comprising, in combination, a body of non-magnetic material having a plurality of spaced apart grooves therein, said body also having a hook trough along its upper edge, a magnetic assembly formed into a loop housed within said body for holding one or more hooks in said grooves, said magnetic assembly having pole bars of opposite polarity, one of said pole bars being situated adjacent the upper edge of said body and along one side of the hook trough, and a fastener fixed to said body in a position remote from said grooves for attaching said body to an article of wearing apparel.

3. As an article of manufacture, a fish hook and lure holder comprising, in combination, a body of non-magnetic material having a front face with a plurality of spaced apart grooves therein, said body also having a rear face remote from said grooves, a magnetic assembly formed into a closed loop embedded within said body for holding one or more hooks in said grooves, said magnetic loop having pole bars of opposite polarity running generally transversely of said grooves, and extended ends on said pole bars projecting substantially through said rear face of said body, said projecting ends being adapted to attach said holder to a support of magnetizable material by magnetic attraction.

4. A fish hook and lure holder comprising, in combination, a body of non-magnetic material having a front face with a plurality of spaced apart grooves therein, a magnetic assembly formed into a closed loop housed within said body for holding one or more hooks in said grooves, said magnetic assembly having pole bars of opposite polarity running generally transversely of said grooves, said pole bars being skewed relative to each other along the general plane of said front face to progressively vary the distance between said bars and thereby accommodate an assortment of varying sized hooks, and means for attaching said holder to a support.

5. As an article of manufacture, a fish hook and lure holder comprising the combination of a body having a front face and a top face with a plurality of spaced apart grooves therein, said grooves running transversely of said top face and being skewed relative to the longitudinal axis thereof, said top face grooves being skewed in the same general direction, a guard wall running longitudinally of said top face but spaced therefrom by a hook trough, said guard wall forming one side of the hook trough, a magnetic assembly formed into a closed loop embedded within said body, said magnetic assembly being adapted to hold one or more hooks in said grooves with the hook points extending into said hook trough, said magnetic assembly having pole bars of opposite polarity running generally transversely of said grooves and longitudinally of said body, said pole bars being skewed relative to each other along the general plane of said front face for accommodating hooks of varying sizes, one of said pole bars being situated adjacent the top face of said body and along one side of said hook trough, and means for attaching said holder to an article of wearing apparel.

6. A fish hook and lure holder comprising, in combination, a body of non-magnetic material having a front face, a top face and a rear face, a plurality of spaced apart ribs disposed in alternate relation with a plurality of grooves in said front face, a corresponding plurality of spaced apart ribs on said top face disposed in alternate relation with a plurality of grooves therein, said ribs and grooves in said top face being skewed in the same direction relative to said top face, and a magnetic member embedded within said body adjacent said front face, top face and rear face, said magnet being positioned and adapted to exert a magnetic attraction force normal to all three of said faces for retaining a hook in place in any one of said grooves.

7. A fish hook and lure holder comprising the combination of a body having a front face and a top face, said front face having a plurality of spaced apart grooves therein, said top face having a hook trough, said top face also having a plurality of skewed grooves each connecting with a corresponding one of said front face grooves and running into said hook trough, said top face grooves being skewed in the same direction, and a magnetic member housed within said body in proximity to said front face and said top face and one side of said hook trough, said magnetic member being adapted to exert a magnetic attraction force on a hook in at least two directions and thereby hold one or more hooks in corresponding ones of said grooves.

References Cited in the file of this patent

UNITED STATES PATENTS

| | | |
|---|---|---|
| 1,397,790 | Tegner | Nov. 22, 1921 |
| 1,578,631 | Bolton | Mar. 30, 1926 |
| 1,900,035 | Beck | Mar. 7, 1933 |
| 2,144,300 | Stryker | Jan. 17, 1939 |
| 2,414,653 | Lookholder | Jan. 21, 1947 |
| 2,447,105 | Vogel | Aug. 17, 1948 |
| 2,493,344 | Hamel | Jan. 3, 1950 |